United States Patent
Tominaga (10) Patent No.: US 11,215,904 B2
(45) Date of Patent: Jan. 4, 2022

(54) WATERPROOF STRUCTURE FOR CAMERA, WATERPROOF LENS UNIT, AND CAMERA SET

(71) Applicant: KOWA COMPANY, LTD., Nagoya (JP)

(72) Inventor: Shuichi Tominaga, Saitama (JP)

(73) Assignee: KOWA COMPANY, LTD., Nagoya (JP)

( * ) Notice: Subject to any disclaimer, the term of this patent is extended or adjusted under 35 U.S.C. 154(b) by 0 days.

(21) Appl. No.: 16/964,309

(22) PCT Filed: Feb. 8, 2019

(86) PCT No.: PCT/JP2019/004565
§ 371 (c)(1),
(2) Date: Jul. 23, 2020

(87) PCT Pub. No.: WO2019/156205
PCT Pub. Date: Aug. 15, 2019

(65) Prior Publication Data
US 2021/0041766 A1    Feb. 11, 2021

(30) Foreign Application Priority Data
Feb. 9, 2018  (JP) ............................. JP2018-021544

(51) Int. Cl.
*G03B 17/08*       (2021.01)
*G02B 7/02*        (2021.01)
(Continued)

(52) U.S. Cl.
CPC ............. *G03B 17/08* (2013.01); *G02B 7/02* (2013.01); *G03B 17/14* (2013.01); *G03B 17/56* (2013.01); *H04N 5/2254* (2013.01)

(58) Field of Classification Search
CPC ........................................................ B63C 11/48
See application file for complete search history.

(56) References Cited

U.S. PATENT DOCUMENTS

| | | | | |
|---|---|---|---|---|
| 4,346,404 A | * | 8/1982 | Gantenbrink | H04N 5/2252 348/81 |
| 5,177,515 A | * | 1/1993 | Tsukamoto | G03B 17/08 396/27 |

(Continued)

FOREIGN PATENT DOCUMENTS

| | | |
|---|---|---|
| JP | 6-294994 A | 10/1994 |
| JP | 2000-75385 A | 3/2000 |

(Continued)

OTHER PUBLICATIONS

International Search Report dated Apr. 16, 2019, issued in counterpart International Application No. PCT/JP2019/004565 (3 pages).

(Continued)

*Primary Examiner* — Clayton E. LaBalle
*Assistant Examiner* — Leon W Rhodes, Jr.
(74) *Attorney, Agent, or Firm* — Westerman, Hattori, Daniels & Adrian, LLP (57) ABSTRACT

A waterproof wall 60 is provided to be interposed between an end face 31 of a base end section of a waterproof lens unit 20 and a mount face 13 of a camera body 10, thereby shutting off the front surface of the camera body 10 from a space in front of the front surface of the camera body 10 by the waterproof wall 60.

17 Claims, 8 Drawing Sheets

(51) Int. Cl.
*G03B 17/14* (2021.01)
*G03B 17/56* (2021.01)
*H04N 5/225* (2006.01)

(56) References Cited

U.S. PATENT DOCUMENTS

| | | | |
|---|---|---|---|
| 7,265,789 B2* | 9/2007 | Takada | H04N 5/2253 |
| | | | 348/345 |
| 8,662,767 B2* | 3/2014 | Honjo | H04N 5/23212 |
| | | | 396/530 |
| 10,281,693 B2* | 5/2019 | Yamahiro | G02B 7/14 |
| 2013/0215253 A1* | 8/2013 | Achtel | G03B 17/14 |
| | | | 348/81 |
| 2013/0236166 A1 | 9/2013 | Enomoto et al. | |
| 2017/0102554 A1 | 4/2017 | Yagi | |

FOREIGN PATENT DOCUMENTS

| | | |
|---|---|---|
| JP | 2006-126742 A | 5/2006 |
| JP | 2014-26188 A | 2/2014 |
| WO | 2015-190182 A1 | 12/2015 |

OTHER PUBLICATIONS

Office Action dated Sep. 23, 2021, issued in counterpart EP application No. 19 751 652.9. (4 pages).

\* cited by examiner

WATERPROOF STRUCTURE FOR CAMERA, WATERPROOF LENS UNIT, AND CAMERA SET

TECHNICAL FIELD

The present invention relates to a waterproof structure for camera for preventing infiltration of water (droplets, moisture, etc.) into a camera body incorporating an imaging element therein.

BACKGROUND ART

It is well known that portable cameras for general users have been already widespread, and camera sets for enterprises are also widely used for the following applications. For example, on a manufacturing line in a factory, image recognition is performed on parts and products flowing on the line to control a manufacturing apparatus and inspecting manufactured products, and a camera set is used for the image recognition of the parts and the products. Camera sets are also used as security cameras and surveillance cameras for security measures. Furthermore, the camera sets are also used as image recognition sensors for robots of various applications in which technological developments are dramatically advanced in recent years. As described above, the camera sets which are widely widespread in various applications may require a waterproof function depending on operating environments thereof, and various waterproof structures for camera have been proposed in the past.

For example, Patent document 1 discloses a waterproof structure for camera of such a type that an entire camera set (a camera body and a lens unit) is housed in a camera case. In addition, Patent Document 2 discloses a waterproof structure for a mount section in which an interchangeable lens unit having a waterproof structure is attached to a camera body having a waterproof structure.

Furthermore, Patent Document 3 discloses a waterproof case for housing a lens unit and a waterproof structure for a joint section of the waterproof case to a camera body on the premise that a lens unit having no waterproof performance is attached to a camera body having a waterproof structure.

PRIOR ART

Patent Document

Patent Document 1: Japanese Patent Application Publication No. 2006-126742
Patent Document 2: Japanese Patent Application Publication No. H6-294994
Patent Document 3: Japanese Patent Application Publication No. 2014-026188
Patent Document 4: International Publication No. WO2015/190182

SUMMARY OF INVENTION

Problem to be Solved by Invention

As described above, various waterproof structures for camera have been conventionally proposed. However, with respect to a camera set based on the assumption that a lens unit having a waterproof structure is exchangeably attached to a camera body having no waterproof performance, a waterproof structure for camera suitable for the camera set has not yet been proposed.

In general, when the camera body has no waterproof performance, a waterproof case as disclosed in Patent Document 1 is used, and a method of accommodating the entire body of the camera body and the lens unit (that is, the entire camera set) has been adopted.

However, in the method of accommodating the entire camera set in the waterproof case, for various kinds of interchangeable lens units of different sizes, it is necessary to prepare waterproof cases whose sizes are individually matched with the sizes of the lens units, which lacks versatility.

The present invention has been implemented in view of the foregoing circumstances, and has an object to provide a highly versatile waterproof structure for camera applied to a camera set in which a waterproof lens unit having waterproof performance is attached to a camera body having no waterproof performance, and a waterproof lens unit used for the waterproof structure.

Means of Solving Problem

In order to attain the foregoing object, a waterproof structure for camera according to the present invention is a waterproof structure for camera to be applied to a camera set comprising a camera body including a built-in imaging element and a mount section having an opening at a front surface thereof, a peripheral surface of the opening serving as a mount face, and a waterproof lens unit that has a mounted section extending in an axial direction from an end face of a base end section, and is fixed to the front surface of the camera body by mounting the mounted section to the mount section, wherein a waterproof wall is provided to be interposed between the end face of the base end section of the waterproof lens unit and the mount face of the camera body, thereby shutting off the front surface of the camera body from a space in front of the front surface of the camera body by the waterproof wall.

First, a waterproof structure for camera for preventing infiltration of water into the camera body from the front side thereof is proposed. For example, this waterproof structure for camera is suitable for a case where dust adhering to the surface of a lens is washed out by spraying water flow to the dust or the like when a camera set installed in a factory is cleaned.

That is, according to the present invention, the camera body is shut off from a space in front of the camera body by the waterproof wall which is provided to be interposed between the end face of the base end section of the waterproof lens unit and the mount face of the camera body, so that infiltration of water from the front side of the camera body into the camera body can be prevented.

With respect to a camera body having a mount section to which a lens unit can be exchangeably attached, a lens unit having a mounted section of the same mount type is attached to the camera body. Accordingly, with respect to various kinds of lens units of different sizes, the structure of interposing the waterproof wall can be also made common to these lens units because the dimensional structures of the mount section and the mounted section are common to each other, so that a waterproof structure for camera having high versatility can be realized.

The waterproof structure for camera of the present invention is based on the premise that a waterproof lens unit having waterproof performance is used.

The waterproof structure for camera according to the present invention may be configured to further comprise a camera case that covers the periphery of the camera body, wherein the front surface wall of the camera case forms the waterproof wall.

The periphery of the camera body is covered by the camera case as described above, whereby infiltration of water not only from the front side, but also from any direction can be prevented for the camera body. Furthermore, since the camera case merely covers the periphery of the camera body, it is unnecessary to exchange the camera case even when the size of the lens unit to be attached to the camera body changes.

It is preferable to configure the waterproof structure for camera so that annular waterproof packing having elasticity is arranged around the mounted section between the end face of the base end section of the waterproof lens unit and a surface of the waterproof wall, and the waterproof packing is pressed by the waterproof lens unit and the waterproof wall.

As a result, infiltration of water from a portion where the waterproof wall is interposed can be more surely prevented.

Next, a waterproof lens unit according to the present invention is characterized by the following configuration.

That is, a waterproof lens unit is configured to comprise a fixed-side tube body and a movable-side lens barrel having a plurality of lenses incorporated therein, wherein a mounted section extends in an axial direction from an end face of a base end section of the fixed-side tube body, the mounted section is fixed to a front surface of the camera body by mounting the mounted section to a mount section opened at a front surface of the camera body, and the movable-side lens barrel is moved in the axial direction relatively to the fixed-side tube body to focus on a target position to be imaged.

Furthermore, the waterproof lens unit is configured so that the movable-side lens barrel is enabled to further approach to a built-in imaging element of the camera body from a movement position of the movable-side lens barrel relative to the fixed-side tube body when the target position to be imaged is set to infinity, and the target position is set in focus while an end surface of a base end section in the fixed-side tube body is positioned to a peripheral surface of an opening of the mount section which forms a mount face in the camera body.

The waterproof lens unit described above becomes a waterproof lens unit suitable for the foregoing waterproof structure for camera according to the present invention by the following configuration.

That is, a base end section of the fixed-side tube body forms a base end section of the waterproof lens unit, and the movable-side lens barrel is enabled to further approach to a built-in imaging element of the camera body by a distance equal to or more than the thickness of the waterproof wall from a movement position of the movable-side lens barrel relative to the fixed-side tube body when a target position to be imaged is set to infinity and the target position is set in focus while the waterproof wall is removed, and an end surface of a base end section in the fixed-side tube body is positioned to a peripheral surface of an opening of the mount section which forms a mount face in the camera body.

In general, the lens mount structure of the camera set is set so as to mount the lens unit to the camera body while the end face of the base end section of the lens unit (the base end section of the fixed-side tube body) is brought into contact with the mount face of the camera body, and a flange back is provided under the above state. The flange back means the distance from the mount face to the imaging element.

Furthermore, a general lens unit is adjusted so that when a target position to be imaged is set to infinity, the movable-side lens barrel is positioned at a movement end at which the movable-side lens barrel is closest to the imaging element, and an image at infinity is formed (that is, set in focus) on the imaging element at the movement end.

The foregoing waterproof structure for camera according to the present invention has been created from an idea that is not bound by these common sense, and the end face of the base end section in the lens unit is arranged in front of the mount face in the camera body by interposing the waterproof wall between the end face of the base end section in the lens unit and the mount face in the camera body. Therefore, in the foregoing general lens unit, an image at infinity is out of focus even when the movable-side lens barrel is moved to the movement end at which the movable-side lens barrel is closest to the imaging element.

Therefore, the waterproof lens unit according to the present invention is configured so that the movable-side lens barrel is enabled to further approach to the imaging element by only a distance equal to or more than the thickness of the waterproof wall from the foregoing movement end of the movable-side lens barrel in the general lens unit (the movement end at which the movable-side lens barrel is closest to the imaging element), thereby making it possible to focus on an image at infinity.

Furthermore, it is preferable that the mounted section of the waterproof lens unit is configured to have a mount structure in which a male screw is formed on an outer peripheral surface of the mounted section, and the male screw is screwed into and engaged with a female screw formed on the camera body.

According to such a screwing type mount structure, by merely extending the length of the male screw formed on the outer peripheral surface of the mounted section, the male screw can be easily threadedly engaged with the female screw formed in the camera body while the waterproof wall is interposed between the end face of the base end section of the fixed-side tube body and the mount face of the camera body.

For example, the gap between the inner peripheral surface of the fixed-side tube body and the outer peripheral surface of the movable-side lens barrel is blocked by a waterproof member, whereby the lens unit can be configured to have a waterproof structure.

Effects of Invention

As described above, according to the waterproof structure for camera of the present invention, the camera body is shut off from the space in front of the camera body by the waterproof wall which is provided to be interposed between the end face of the base end section of the waterproof lens unit and the mount face of the camera body, so that infiltration of water from the front side into the camera body can be prevented by the waterproof wall.

Furthermore, according to the waterproof lens unit of the present invention, it is possible to focus on an image at infinity even in the case of applying to the waterproof structure for camera in which the waterproof wall is interposed between the end face of the base end section in the lens unit and the mount face in the camera body.

BRIEF DESCRIPTION OF DRAWINGS

FIG. 1A and FIG. 1B are diagrams showing a waterproof structure for camera according to a first embodiment of the present invention, wherein

FIG. 2A and FIG. 233 are views showing the disassembled waterproof structure for camera according to the first embodiment of the present invention, wherein

FIG. 3A and FIG. 3B are front end views showing the waterproof lens unit according to the first embodiment of the present invention, wherein FIG. 3A and FIG. 3B show states where a movable-side lens barrel is moved to different movement positions, respectively.

FIG. 6A and FIG. 6B are diagrams showing a waterproof structure for camera according to a second embodiment of the present invention, wherein

EXPLANATION OF REFERENCE NUMBERS

10: camera body
11: imaging element
12: mount section
12a female screw section
13: mount face
20: waterproof lens unit
30: fixed-side tube body
30a: female screw
31: end face of base end section in fixed-side tube body
32: mounted section
32a: male screw section
40: movable-side lens barrel
40a: male screw
40b: rotational operation section
41: diaphragm plate
42: front lens group
43: front lens fixed tube
44: spacer
45: fixing ring
46: through-hole
47: top lens
S: space
48: waterproof packing
50: rear lens group
51: rear lens fixed tube
52 fixing ring
55: waterproof member
56: nut member 60: waterproof wall
61: mount hole
62: waterproof packing
70: camera case
71: front wall
80: connector
81: signal cable
82: bush
90: movement amount regulating ring

EMBODIMENTS FOR CARRYING OUT THE INVENTION

Embodiments according to the present invention will be described hereunder in detail with reference to the drawings.

First Embodiment

FIGS. 1A to 5C are diagrams showing a waterproof structure for camera and a waterproof lens unit according to a first embodiment of the present invention.

Figure 1A:
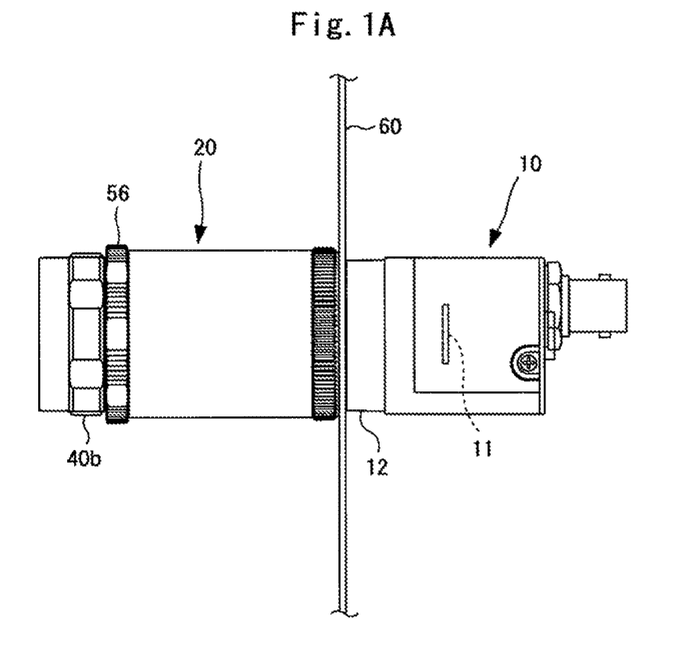
FIG. 1A is a front view.
Figure 1B:
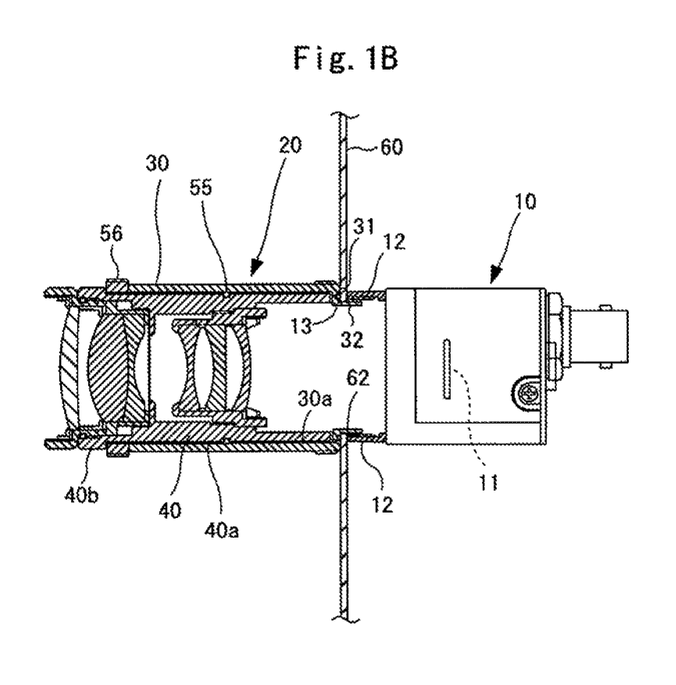
FIG. 1B is an end view of a waterproof lens unit and a mount section of a camera body which are cut and viewed.

The waterproof structure for camera is applied to a camera set comprising a camera body 10 and a waterproof lens unit 20. The camera body 10 has a built-in imaging element 11 such as a CCD image sensor, and also has a mount section 12 opened at the front surface thereof. The waterproof lens unit 20 is exchangeably attached to the mount section 12. The camera body 10 has no waterproof performance, and there is a risk that built-in components containing the imaging element 11 may be damaged when water infiltrates into the camera body 10. Therefore, a waterproof structure for camera is incorporated in order to prevent infiltration of water into the camera body 10.

In the present embodiment, a conventional waterproof lens unit disclosed in Patent Document 4 is improved to configure a waterproof lens unit 20 suitable for a waterproof structure for camera according to the present invention.

Figure 3A:
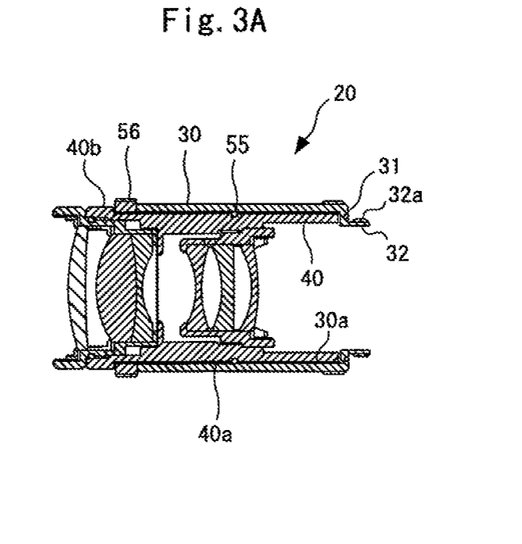
Figure 3B:
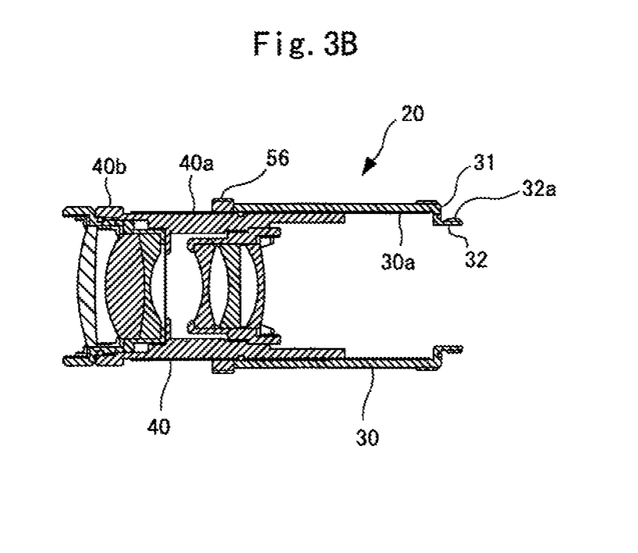

That is, the waterproof lens unit 20 includes a fixed-side tube body 30, a movable-side lens barrel 40. As shown in FIG. 3A, FIG. 3B, the movable-side lens barrel 40 is movable in an axial direction relatively to the fixed-side tube body 30, and is configured to focus on a target position to be imaged (that is, to form an image at the target position on the imaging element 11) by moving the movable-side lens barrel 40 relatively to the fixed-side tube body 30.

A tubular mounted section 32 extends in an axial direction from an end face 31 of a base end section of the fixed-side tube body 30 (which is also an end face 31 of a base section of the waterproof lens unit 20), and the waterproof lens unit 20 is fixed to the front surface of the camera body 10 by mounting the mounted section 32 to the mount section 12 of the camera body 10.

Various schemes are known as a mounting scheme for a camera to which a lens unit is attached. The mount section 12 of the camera body 10 and the mounted section 32 of the waterproof lens unit 20 are configured by a common mounting scheme. For example, the present embodiment adopts a screwing type mounting scheme called as C-mount, and is configured so that a male screw section 32a formed on the outer peripheral surface of the mounted section 32 in the waterproof lens unit 20 is screwed into a female screw section 12a formed on the inner peripheral camera body 10, thereby mounting the mounted section 32 to the surface of the mount section 12 in the mount section 12 (see FIG. 2A, FIG. 1B).

A camera set to which the waterproof structure for camera of the present invention is applied is not limited to a camera set adopting the screwing type mounting scheme such as C-mount, but may a camera set adopting another mounting scheme.

Figure 4A:
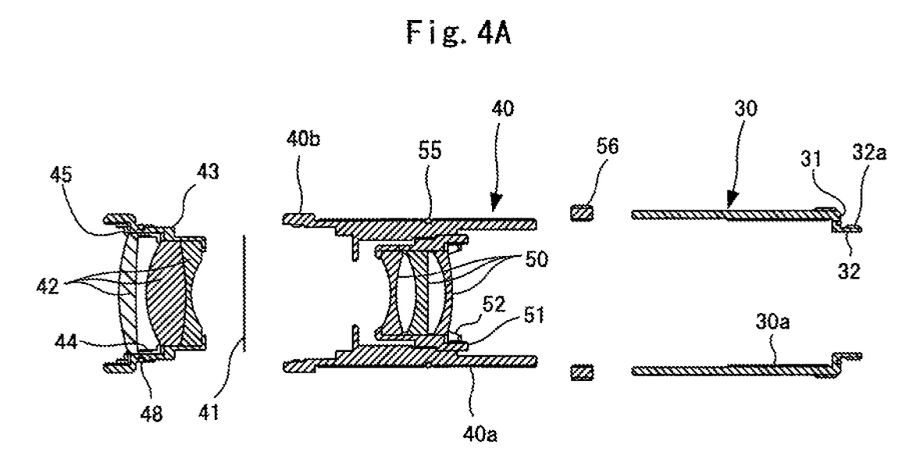
FIG. 4A is a front end view showing the disassembled waterproof lens unit according to the first embodiment of the present invention.

As shown in FIG. 4A, plural lenses and a diaphragm plate 41 are incorporated in the movable-side lens barrel 40. The plural lenses are classified into a front lens group 42 incorporated from a top end side (left side in figures) of the movable-side lens barrel 40 and a rear lens group 50 incorporated from a base end side (right side in figures) of the movable-side lens barrel 40.

Figure 4B:
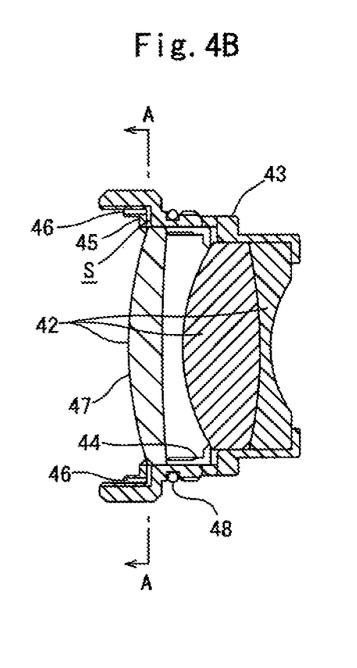
FIG. 4B is an enlarged front end view of an incorporation structure of a front lens group in a front lens fixed tube.
Figure 4C:
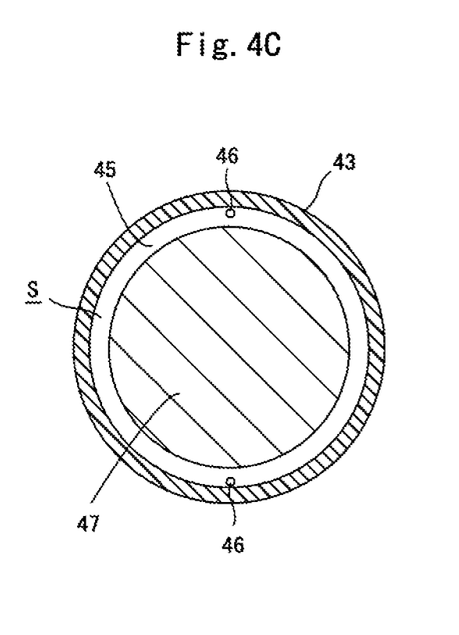
FIG. 4C is a cross-sectional view of an A-A line in FIG. 4B.

The front lens group 42 is successively appropriately fitted from the front side to a front lens fixed tube 43 while interposing a spacer 44 therebetween, and fixed from the top end side by a fixing ring 45. As shown in FIG. 4B, FIG. 4C, through-holes 46 are formed at two places of a fixing ring 45 which are spaced from each other by 180°. FIG. 4C is a view of the left direction in FIG. 4B from an A-A cross section passing through the space S in FIG. 4B. A space S is formed at an outer peripheral portion of a top lens 47 which is fitted at the forefront position of the front lens fixed tube 43, the outer peripheral portion being blocked by the fixing ring 45, and each through-hole 46 intercommunicates with the space S.

After lenses are assembled to the front lens fixed tube 43, one through-hole 46 is positioned at an upper position, and adhesive agent is filled from this through-hole 46. As a result, the adhesive agent flows through the through-hole 46 into the space S, and fully filled in the space S. At this time, air in the space S is discharged through the other through-hole 46 disposed at a lower position. As described above, the adhesive agent is filled from the through-hole 46 at the upper position until the adhesive agent overflows from the through-hole 46 at the lower position. This treatment makes it possible to form a waterproof structure having no gap between the outer peripheral surface of the top lens 47 and the inner peripheral surface of the front lens fixed tube 43.

With respect to the top lens 47 whose surface is exposed, it is preferable to subject the surface of the top lens 47 to water-repellent finishing because it can avoid water droplets from adhering to the surface and remaining there.

From a state shown in FIG. 4A, the diaphragm plate 41 is fitted from the top end (left side in FIG. 4A) into the movable-side lens barrel 40, and then the front lens fixed tube 43 is screwed into the movable-side lens barrel 40, whereby the diaphragm plate 41 and the front lens group 42 are incorporated in the movable-side lens barrel 40. Annular waterproof packing 48 (for example, an O-ring) is provided between the inner peripheral surface of the movable-side lens barrel 40 and the front lens fixed tube 43, thereby forming a waterproof structure having no break.

A rear lens group 50 is successively fitted into a rear lens fixed tube 51 from a rear side, and fixed from the rear side by a fixing ring 52. As shown in FIG. 4A, the rear lens fixed tube 51 is screwed from the base end (right side in FIG. 4A) into the movable-side lens barrel 40, whereby the rear lens group 50 is incorporated in the movable-side lens barrel 40.

As shown in FIG. 4A, a female screw 30a is formed from a base end section within a certain range in the axial direction on the inner peripheral surface of the fixed-side tube body 30. Furthermore, a male screw 40a is formed on the outer peripheral surface of the movable-side lens barrel 40. The movable-side lens barrel 40 is fitted into the fixed-side tube body 30, and the male screw 40a is threadedly engaged with the female screw 30a. A rotational operation section 40b is formed on the outer periphery of the top end section of the movable-side lens barrel 40, and the movable-side lens barrel 40 is moved in the axial direction relatively to the fixed-side tube body 30 with a screw mechanism based on the female screw 30a and the male screw 40a by rotating the rotational operation section 40b.

As shown in FIG. 3A, FIG. 3B, a waterproof member 55 such as annular waterproof packing (for example, an O-ring as toric waterproof packing) is provided between the inner peripheral surface of the fixed-side tube body 30 and the outer peripheral surface of the movable-side lens barrel 40. The gap between the inner peripheral surface of the fixed-side tube body 30 and the outer peripheral surface of the movable-side lens barrel 40 is blocked by this waterproof member 55 to form a waterproof structure. The waterproof member 55 is not limited to the toric waterproof packing, but waterproof packing which is annularly configured in a polygonal shape such as a rectangular shape may be applied. The waterproof packing is not limited to the O-ring, but waterproof packing having a cross-sectional shape other than a circular shape may be applied. Furthermore, a viscous material such as grease may be applied as the waterproof member 55, and the viscous material may be filled in the gap between the inner peripheral surface of the fixed-side tube body 30 and the outer peripheral surface of the movable-side lens barrel 40 to form a waterproof structure.

Furthermore, as shown in FIG. 3B, etc., a nut member 56 is threadedly engaged with the male screw 40a of the movable-side lens barrel 40. The nut member 56 constitutes a double nut for restricting the relative rotation of the movable-side lens barrel 40 to the fixed-side tube body 30. That is, the movable-side lens barrel 40 is rotationally operated to be moved in the axial direction, and then the nut member 56 is rotationally operated to press the nut member 56 against the tip face of the fixed-side tube body 30. This operation makes it possible to eliminate looseness between the male screw 40a of the movable-side lens barrel 40 and the female screw 30a of the fixed-side tube body 30, and restrict unintended rotation of the movable-side lens barrel 40 due to vibration or the like as described in Patent Document 4.

The waterproof lens unit 20 focuses on a target position to be imaged by moving the movable-side lens barrel 40 in the axial direction relatively to the fixed-side tube body 30. That is, an image at the target position is formed on the imaging element 11.

Next, a waterproof structure for camera according to the present embodiment will be described.

The waterproof structure for camera is configured by providing a waterproof wall 60 so that the waterproof wall 60 is interposed between the end face 31 of the base end section in the waterproof lens unit 20 and a mount face 13 of the camera body 10 as shown in FIGS. 1A to 2B.

Figure 2A:
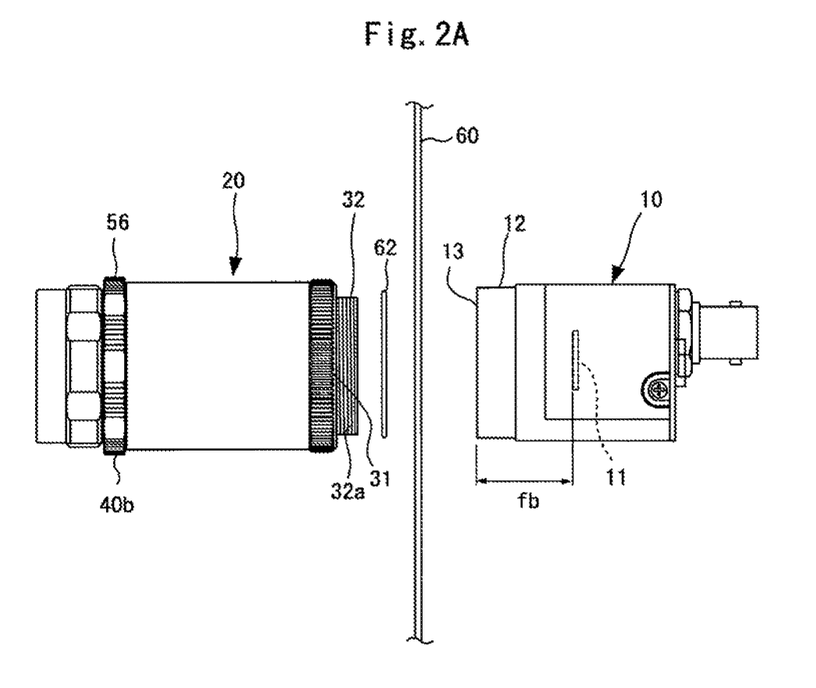
FIG. 2A is a front view.
Figure 2B:
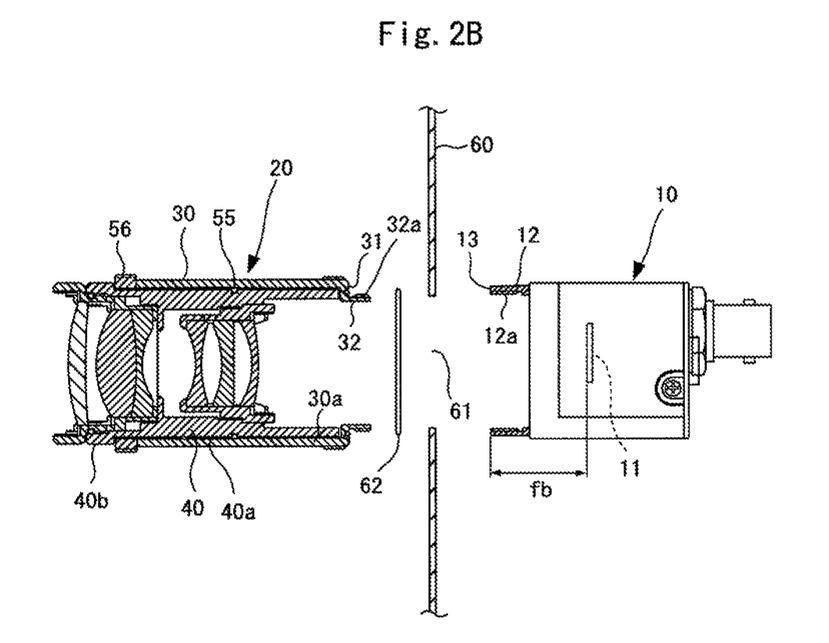
FIG. 2B is an end view of the waterproof lens unit, a waterproof wall and the mount section of the camera body which are cut and viewed.

A circular mount hole 61 is formed in the waterproof wall 60 as shown in FIG. 2B. The inner diameter of the mount hole 61 is set to a dimension which enables the mounted section 32 of the waterproof lens unit 20 to penetrate through the mount hole 61, but disenables the mount section 12 of the camera body 10 to penetrate through the mount hole 61.

The waterproof wall 60 is fitted to the mounted section 32 of the waterproof lens unit 20 through the mount hole 61. Subsequently, the mounted section 32 of the waterproof lens unit 20 is screwed into the mount section 12 of the camera body 10. As a result, the waterproof wall 60 is interposed between the end face 31 of the base end section in the waterproof lens unit 20 and the mount face 13 of the camera body 10. Here, the mount face 13 is the peripheral surface of the opening of the mount section 12.

The front surface of the camera body 10 is shut off from a space in front of the front surface by the waterproof wall 60, thereby preventing infiltration of water into the camera body 10 from the front side.

Furthermore, annular waterproof packing 62 having elasticity (for example, an O-ring as toric waterproof packing) is disposed between the end face 31 of the base end section of the waterproof lens unit 20 and the surface of the waterproof wall 60 and around the mounted section 32. The waterproof packing 62 is pressed and deformed between the waterproof lens unit 20 and the waterproof wall 60. By interposing the waterproof packing 62 as described above, infiltration of water from the portion at which the waterproof wall 60 is interposed can be more surely prevented.

The waterproof packing 62 is also not limited to the toric O-ring, and waterproof packing configured annularly in a polygonal shape such as a rectangular shape, or waterproof packing having a cross-sectional shape other than a circular shape may be adopted.

Here, the male screw section 32a formed on the mounted section 32 of the waterproof lens unit 20 has a length which enables the male screw section 32a to be threadedly engaged with the female screw section 12a formed on the mount section 12 of the camera body 10 under the state that the waterproof wall 60 is interposed between the end face 31 of the base end section of the fixed-side tube body 30 and the mount face 13 of the camera body 10.

The built-in imaging element 11 of the camera body 10 is arranged at a predetermine distance from the mount face 13 with respect to the mount face 13 as the peripheral surface of the opening of the mount section 12. The distance from the mount face 13 to the imaging element 11 is referred to as flange back (fb).

Figure 5A:
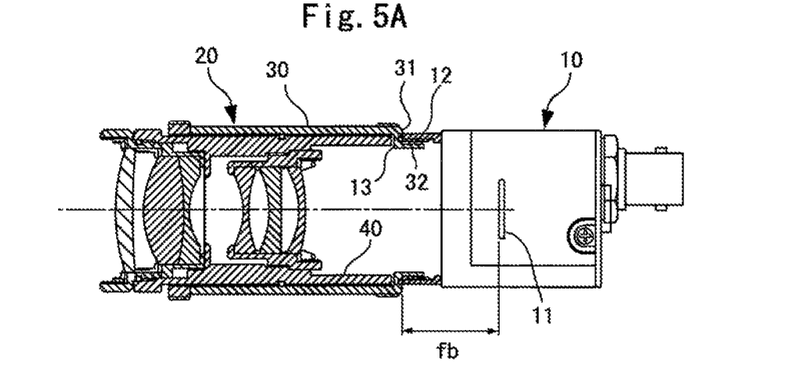
FIG. 5A, FIG. 5B and FIG. 5C are an end view to explain setting of a movable range of the movable-side lens barrel in the waterproof lens unit.

In general, the lens unit is attached to the camera body while the mount face 13 abuts on the end face 31 of the base end section of the waterproof lens unit 20 (the end face 31 of the base end section of the fixed-side tube body 30) as shown in FIG. 5A.

A general lens unit is adjusted so that the movable-side lens barrel 40 is arranged at a movement end at which the movable-side lens barrel 40 is closest to the imaging element 11 with respect to the fixed-side tube body 30 when a target position to be imaged is set to infinity under the above mount state, and at this movement position, an image at infinity is formed (that is, set in focus) on the imaging element 11 (see FIG. 5A).

On the other hand, the waterproof structure for camera according to this embodiment is configured by providing the waterproof wall 60 so that the waterproof wall 60 is interposed between the end face 31 of the base end section in the waterproof lens unit 20 and the mount face 13 of the camera body 10.

Figure 5B:
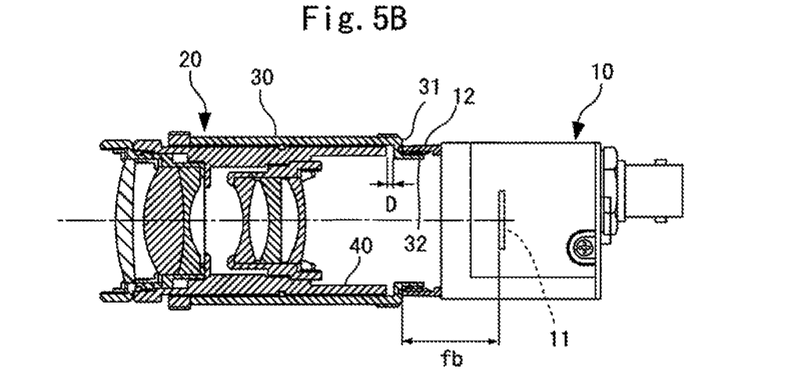
Figure 5C:
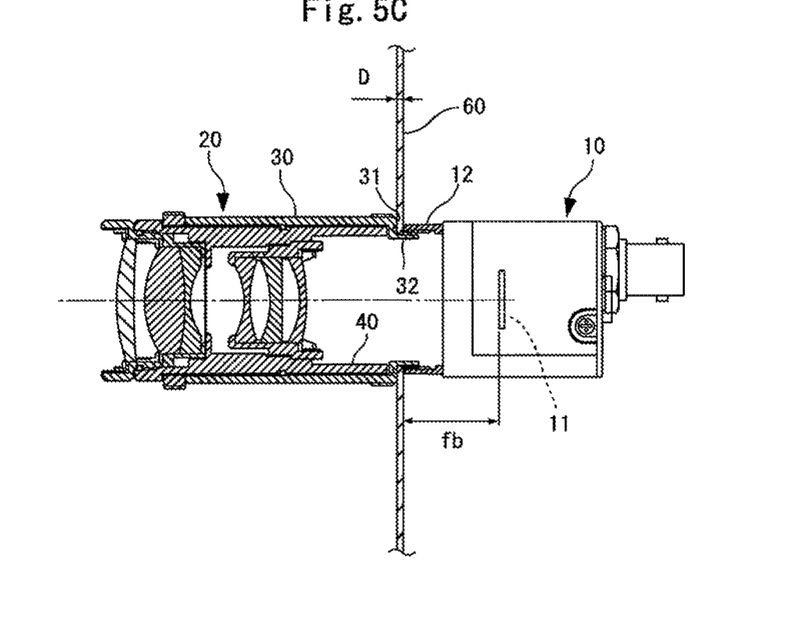

Therefore, the mount face 13 of the camera body 10 is spaced from the end face 31 of the base end section in the waterproof lens unit 20 (that is, the end face 31 of the base end section in the fixed-side tube body 30) by the distance corresponding to only the thickness D of the waterproof wall 60 (see FIG. 5C).

Accordingly, in the general lens unit described above, even when movable-side lens barrel 40 is moved to the movement end at which the movable-side lens barrel 40 is closest to the imaging element 11, an image at infinity is out of focus.

Therefore, the waterproof lens unit 20 according to the present embodiment is configured so that the movable-side lens barrel 40 can further approach to the imaging element 11 from the movement end of the movable-side lens barrel 40 in the general lens unit (the movement end at which the movable-side lens barrel 40 is closest to the imaging element 11) as shown in FIG. 5A by only the distance equal to or more than the thickness D of the waterproof wall 40 or more.

As a result, even when the waterproof wall 60 is interposed between the end face 31 of the base end section in the waterproof lens unit 20 and the mount face 13 of the camera body 10, it is possible to focus on an image at infinity.

For example, the base end section of the movable-side lens barrel 40 is shortened by the length equal to or larger than the thickness D of the waterproof wall 60 as shown in FIG. 5B with respect to the waterproof lens unit 20 which is set as in the case of the general lens unit as shown in FIG. 5A. This configuration enables the movable-side lens barrel 40 to further approach to the imaging element 11 by the distance equal to or larger than the thickness D of the waterproof wall 60 with respect to the fixed-side tube body 30.

The area and shape of the waterproof wall 60 may be freely designed. It is possible to configure a waterproof structure for plural camera sets with a single waterproof wall 60 by providing plural mount holes 61 in the waterproof wall 60 and fitting each camera set to each of the mount holes 61.

Second Embodiment

Figure 6A:
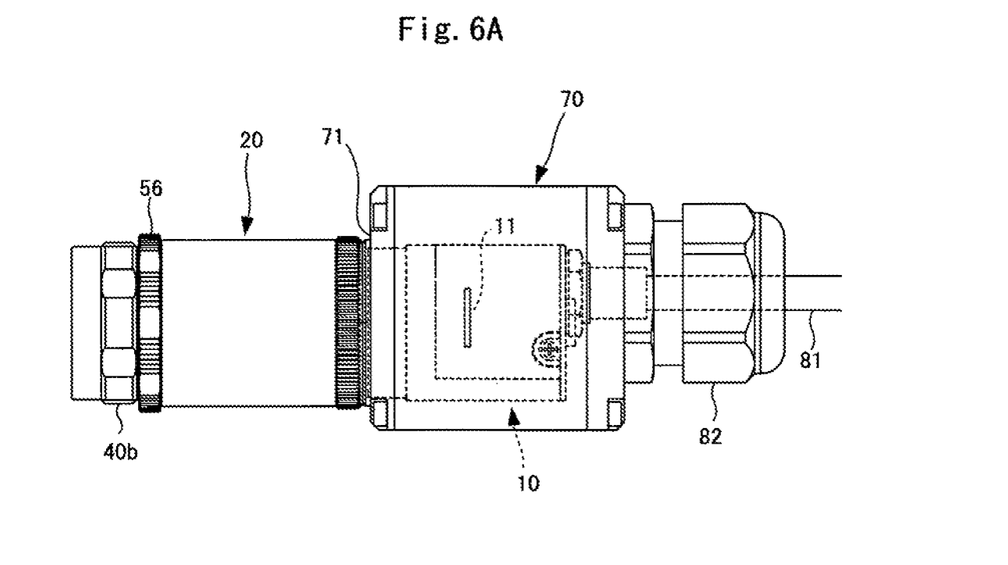
FIG. 6A is a front view.
Figure 6B:
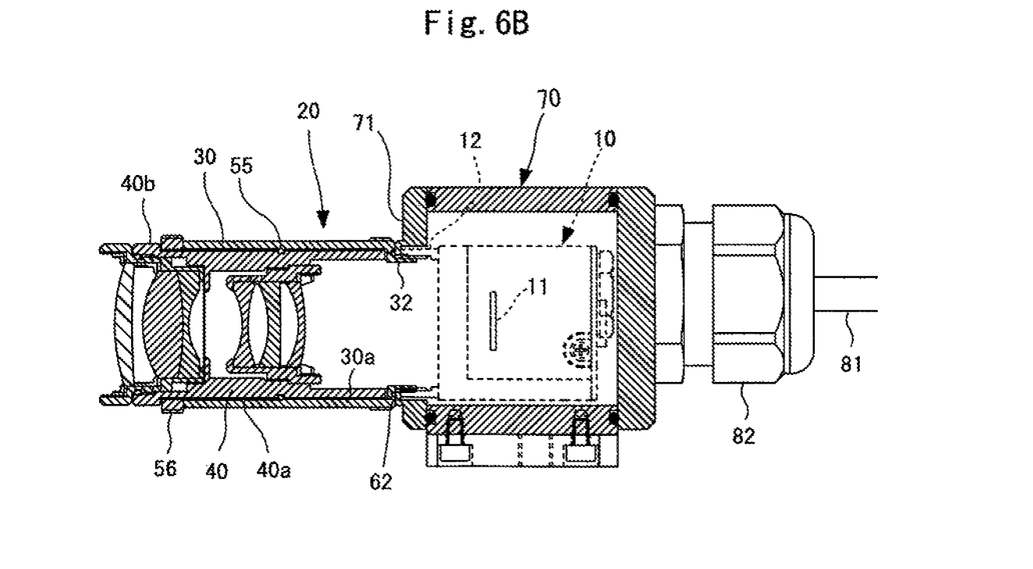
FIG. 6B is an end view of a waterproof lens unit and a camera case which are cut and viewed.
Figure 7:
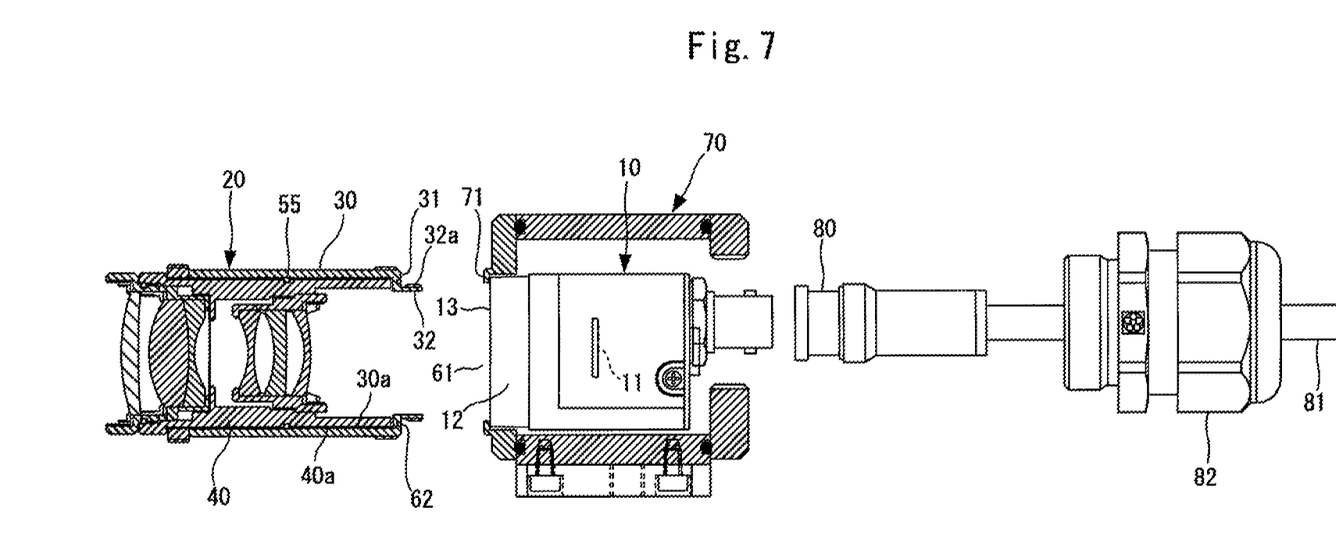
FIG. 7 is a diagram showing the disassembled waterproof structure for camera according to the second embodiment of the present invention, and also an end view of the waterproof lens unit and the camera case which are cut and viewed.

FIGS. 6A to 7 are diagrams showing a waterproof structure for camera according to a second embodiment of the present invention. In the waterproof structure for camera according to the second embodiment shown in these figures, the same parts as or corresponding parts to those of the waterproof structure for camera according to the first embodiment described above are represented by the same reference signs, and detailed description thereof is omitted.

In the waterproof structure for camera according to the second embodiment, the waterproof structure of the camera body 10 is configured by using a camera case 70. The camera case 70 is formed to be large enough to accommodate the camera body 10 therein, and a front surface wall 71 forms the waterproof wall 60. That is, as shown in FIG. 7, a circular mount hole 61 is formed in the front surface wall 71 of the camera case 70, and the inner diameter of the mount hole 61 is set to a dimension which enables the mounted section 32 of the waterproof lens unit 20 to penetrate through the mount hole 61, but disenables the mount section 12 of the camera body 10 to penetrate through the mount hole 61.

In the camera body 10 in which the camera case 70 is accommodated, the mount section 12 is disposed coaxially with the mount hole 61, and the mount face 13 is brought into contact with the inner surface of the front surface wall 71. Then, the mounted section 32 of the waterproof lens unit 20 is inserted into the mount hole 61 from the outside of the camera case 70, and screwed into and mounted to the mount section 12 of the camera body 10.

As a result, the waterproof wall 60 is interposed between the end face 31 of the base end section in the waterproof lens unit 20 and the mount face 13 of the camera body 10, thereby configuring the waterproof structure for camera. Furthermore, the periphery of the camera body 10 is covered by the camera case 70, which makes it possible to prevent infiltration of water not only from the front side, but also from any direction for the camera body 10.

Since the camera case 70 is configured to accommodate only the camera body 10, variation in size of the lens unit to be attached to the camera body 10 does not affect the camera case 70, and it is unnecessary to exchange the camera case 70.

As shown in FIG. 7, a signal cable 81 is connected to the camera body 10 via a connector 80. The signal cable 81 is inserted into the camera case 70 through a bush 82 having waterproof performance.

The present invention is not limited to the foregoing embodiment, and it is needless to say that various modifications and applications may be made without changing the subject matter.

Figure 8:
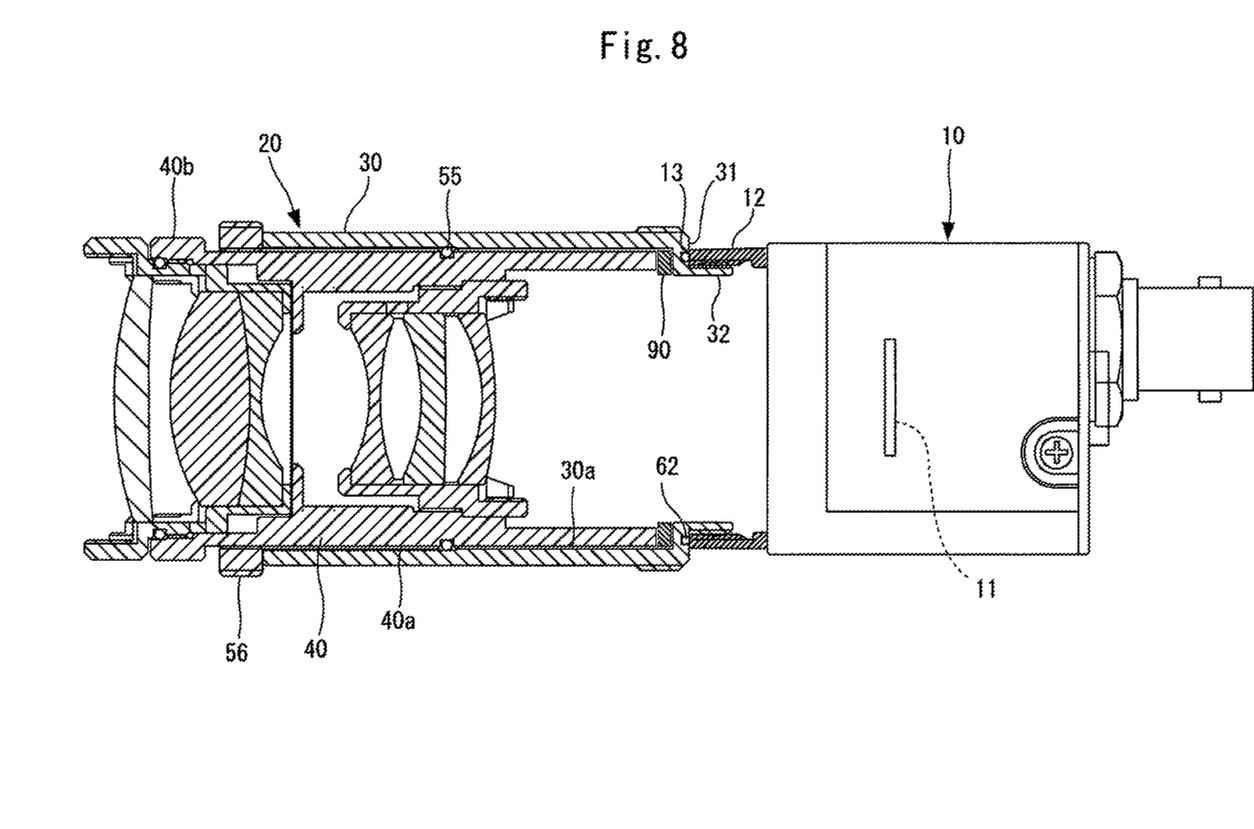
FIG. 8 is a diagram showing an application example of the waterproof lens unit according to the present invention, and also an end view of the waterproof lens unit and a mount section of a camera body which are cut and viewed.

For example, the waterproof camera unit may be used for a general cameral set using no waterproof wall 60 as shown in FIG. 8. In this case, relatively to the fixed-side tube body 30, the movable-side lens barrel 40 can further move to a position closer to the imaging element 11 than a movement position where the position at infinity is in focus. Therefore, at that movement end, the position at infinity is out of focus.

Therefore, as shown in FIG. 8, more movement than necessary of the movable-side lens barrel 40 can be restricted by interposing a movement amount regulating ring 90 between the base end face in the hollow portion of the fixed-side tube body 30 and the base end face of the movable-side lens barrel 40.

In the waterproof camera unit, the thickness of the movement amount regulating ring 90 may be set to a thickness which is matched with a movement amount by which the movable-side lens barrel 40 can further approach to the imaging element 11 from the movement end of the movable-side lens barrel 40 in the general lens unit (the movement end at which the movable-side lens barrel 40 is closest to the imaging element 11).

The invention claimed is:

1. A waterproof structure for camera configured to be applied to a camera set, the waterproof structure comprising:
    a camera body including a built-in imaging element and a mount section having an opening at a front surface thereof, a peripheral surface of the opening of the mount section serving as a mount face; and
    a waterproof lens unit that has a mounted section extending in an axial direction from an end face of a base end section, and is fixed to the front surface of the camera body by mounting the mounted section to the mount section, wherein a waterproof wall is provided to be interposed between the end face of the base end section of the waterproof lens unit and the mount face of the camera body, thereby shutting off the front surface of the camera body from a space in front of the front surface of the camera body by the waterproof wall,
    wherein a mount hole is formed in the waterproof wall, and an inner diameter of the mount hole is set to a dimension which enables the mounted section of the waterproof lens unit to penetrate the mount hole, but disenables the mount section of the camera body to penetrate through the mount hole.

2. The waterproof structure for camera according to claim 1, further comprising a camera case that covers the periphery of the camera body, a front surface wall of the camera case forming the waterproof wall.

3. The waterproof structure for camera according to claim 1, wherein annular waterproof packing having elasticity is arranged between the end face of the base end section of the waterproof lens unit and a surface of the waterproof wall and around the mounted section, and the waterproof packing is pressed by the waterproof lens unit and the waterproof wall.

4. The waterproof structure for camera according to claim 1, further comprising a camera case that covers the periphery of the camera body, a front surface wall of the camera case forming the waterproof wall, wherein the waterproof structure for camera is configured so that annular waterproof packing having elasticity is arranged between the end face of the base end section of the waterproof lens unit and a surface of the waterproof wall and around the mounted section, and the waterproof packing is pressed by the waterproof lens unit and the waterproof wall.

5. A waterproof lens unit comprising:
    a fixed-side tube body; and
    a movable-side lens barrel having a plurality of lenses incorporated therein,
    wherein a mounted section extends in an axial direction from an end face of a base end section of the fixed-side tube body, the mounted section is fixed to a front surface of the camera body by mounting the mounted section to a mount section opened at a front surface of the camera body, and the movable-side lens barrel is moved in the axial direction relatively to the fixed-side tube body to focus on a target position to be imaged, and
    wherein the waterproof lens unit is used for a waterproof structure for camera configured so that a waterproof wall is provided to be interposed between the end face of the base end section of the waterproof lens unit and the mount face of the camera body, thereby shutting off the front surface of the camera body from a space in front of the front surface of the camera body by the waterproof wall, and the waterproof lens unit is configured so that a base end section of the fixed-side tube body forms a base end section of the waterproof lens unit, and the movable-side lens barrel is enabled to further approach to the built-in imaging element of the camera body by a distance equal to or larger than the thickness of the waterproof wall from a movement position of the movable-side lens barrel relative to the fixed-side tube body when a target position to be imaged is set to infinity and the target position is set in focus while the waterproof wall is removed and an end surface of a base end section in the fixed-side tube body is positioned to a peripheral surface of an opening of the mount section which forms a mount face in the camera body.

6. The waterproof lens unit according to claim 5, wherein the mounted section has a mount structure in which a male screw is formed on an outer peripheral surface of the mounted section, and the male screw is screwed into and engaged with a female screw formed on the camera body.

7. The waterproof lens unit according to claim 6, further comprising a waterproof member for blocking a gap between an inner peripheral surface of the fixed-side tube body and an outer peripheral surface of the movable-side lens barrel.

8. The waterproof lens unit according to claim 6, wherein the male screw formed on the outer peripheral surface of the mounted section has a length which allows the male screw to be threadedly engaged with the female screw formed on the camera body while the waterproof wall is provided to be interposed between the end face of the base end section of the fixed-side tube body and the mount face of the camera body.

9. The waterproof lens unit according to claim 8, further comprising a waterproof member for blocking a gap between an inner peripheral surface of the fixed-side tube body and an outer peripheral surface of the movable-side lens barrel.

10. The waterproof lens unit according to claim 5, further comprising a waterproof member for blocking a gap between an inner peripheral surface of the fixed-side tube body and an outer peripheral surface of the movable-side lens barrel.

11. The waterproof lens unit according to claim 5, wherein the waterproof structure for camera further comprises a camera case that covers the periphery of the camera body, a front surface wall of the camera case forming the waterproof wall.

12. The waterproof lens unit according to claim 5, wherein the waterproof structure for camera is configured so that annular waterproof packing having elasticity is arranged between the end face of the base end section of the waterproof lens unit and a surface of the waterproof wall and around the mounted section, and the waterproof packing is pressed by the waterproof lens unit and the waterproof wall.

13. The waterproof lens unit according to claim 5, wherein the waterproof structure for camera further comprises a camera case that covers the periphery of the camera body, a front surface wall of the camera case forming the waterproof wall, and is configured so that annular waterproof packing having elasticity is arranged between the end face of the base end section of the waterproof lens unit and a surface of the waterproof wall and around the mounted section, and the waterproof packing is pressed by the waterproof lens unit and the waterproof wall.

14. A camera set comprising:
   a camera body including a built-in imaging element and a mount section having an opening at a front surface thereof, a peripheral surface of the opening of the mount section serving as a mount face;
   a waterproof lens unit that has a mounted section extending in an axial direction from an end face of a base end section, and is fixed to the front surface of the camera body by mounting the mounted section to the mount section; and
   a waterproof structure for camera configured so that a waterproof wall is provided to be interposed between the end face of the base end section of the waterproof lens unit and the mount face of the camera body, thereby shutting off the front surface of the camera body from a space in front of the front surface of the camera body by the waterproof wall,
   wherein a mount hole is formed in the waterproof wall, and an inner diameter of the mount hole is set to a dimension which enables the mounted section of the waterproof lens unit to penetrate the mount hole, but disenables the mount section of the camera body to penetrate through the mount hole.

15. The camera set according to claim 14, wherein the waterproof structure for camera further comprises a camera case that covers the periphery of the camera body, a front surface wall of the camera case forming the waterproof wall.

16. The camera set according to claim 14, wherein the waterproof structure for camera is configured so that annular waterproof packing having elasticity is arranged between the end face of the base end section of the waterproof lens unit and a surface of the waterproof wall and around the mounted section, and the waterproof packing is pressed by the waterproof lens unit and the waterproof wall.

17. The camera set according to claim 14, wherein the waterproof structure for camera further comprises a camera case that covers the periphery of the camera body, a front surface wall of the camera case forming the waterproof wall, and is configured so that annular waterproof packing having elasticity is arranged between the end face of the base end section of the waterproof lens unit and a surface of the waterproof wall and around the mounted section, and the waterproof packing is pressed by the waterproof lens unit and the waterproof wall.

* * * * *